(12) United States Patent
Yamagiwa et al.

(10) Patent No.: US 6,972,673 B2
(45) Date of Patent: Dec. 6, 2005

(54) AIR PRESSURE DETECTING DEVICE FOR WHEEL

(75) Inventors: Toshio Yamagiwa, Saitama (JP); Tomoyuki Harada, Saitama (JP); Osamu Bunya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 475 days.

(21) Appl. No.: 09/988,753

(22) Filed: Nov. 20, 2001

(65) Prior Publication Data

US 2003/0112135 A1    Jun. 19, 2003

(30) Foreign Application Priority Data

Nov. 20, 2000 (JP) .............................. 2000-352999

(51) Int. Cl.[7] .............................................. B60C 23/00
(52) U.S. Cl. .................... 340/447; 340/442; 73/146.8; 137/557
(58) Field of Search ............................... 340/447, 442, 340/445, 448; 73/146, 146.3, 146.8, 146.5; 137/227, 557

(56) References Cited

FOREIGN PATENT DOCUMENTS

| DE | 24 41 430 A1 | 4/1975 |
|---|---|---|
| DE | 35 38 233 A1 | 5/1986 |
| DE | 43 09 265 A1 | 10/1993 |
| EP | 0 241 852 A2 | 10/1987 |
| JP | A 10-44726 | 2/1998 |
| WO | 99/01301 A1 | 1/1999 |

*Primary Examiner*—Davetta W. Goins
(74) *Attorney, Agent, or Firm*—Birch, Stewart, Kolasch & Birch, LLP

(57) ABSTRACT

An end of a hollow member is connected to an air valve for introducing air into a tire. A detecting and transmitting unit for detecting an air pressure in the tire and transmitting pressure information out of the detecting and transmitting unit is connected to an opposite end of the hollow member. A detecting and transmitting unit is mounted on a hub of a wheel portion. The positioning of the detecting and transmitting unit minimizes any deviation from the dynamic balancing of the wheel. Consequently, the air pressure detecting device for a wheel can be subsequently installed on the vehicle.

13 Claims, 9 Drawing Sheets

AIR PRESSURE DETECTING DEVICE FOR WHEEL

CROSS-REFERENCE TO RELATED APPLICATIONS

The present application claims priority under 35 USC 119 to Japanese Patent Application No. 2000-352999 filed on Nov. 20, 2000 the entire contents thereof is hereby incorporated by reference.

BACKGROUND OF THE INVENTION

1. Field of the Invention

The present invention relates to an air pressure detecting device for a wheel for detecting the air pressure of a tire to allow the driver to recognize the air pressure of the tire even while the vehicle is being operated.

2. Description of Background Art

One air pressure detecting device for a wheel for allowing the driver to recognize the air pressure of a tire even while the vehicle is being operated is known from Japanese Patent Laid-open No. Hei 10-44726 entitled "Tire Air Pressure Warning Device."

According to FIG. 1 of Japanese Patent Laid-open No. Hei 10-44726, the disclosed arrangement is a tire air pressure warning device having a valve stem 10 (the reference numeral is from the publication) mounted on a wheel rim 1, a case 2 disposed beneath the valve stem 10, and a transmitter 7 housed in the case 2 and comprising a pressure detector 3, a signal processing circuit 4, and a cell 5.

While the above tire air pressure warning device is of a structure that can be mounted on a tubeless tire, it is not suitable for use on a tire with a tube.

Since the above tire air pressure warning device has the pressure detector 3, the signal processing circuit 4, and the cell 5 which are concentrated around the valve stem 10, it may possibly impair the dynamic balancing of the wheel. Therefore, there has been a demand for a tire air pressure warning device for a wheel which does not largely affect the dynamic balancing of the wheel.

SUMMARY OF THE INVENTION

It is therefore an object of the present invention to provide an air pressure detecting device for a wheel which can be mounted on a tire with a tube and a tubeless tire and which does not largely affect the dynamic balancing of the wheel.

To achieve the above object, an air pressure detecting device for a wheel includes an end of a hollow member that is connected to an air valve for introducing air into a tire. A detecting and transmitting unit for detecting an air pressure in the tire and transmitting pressure information out of the detecting and transmitting unit is connected to an opposite end of the hollow member. The detecting and transmitting unit is attached to the hub of a wheel portion.

The air pressure of the tire which is detected is effective drive information that can be used while the vehicle is being operated. One end of the hollow member is connected to the air valve, the detecting and transmitting unit is connected to the opposite end of the hollow member, and the detecting and transmitting unit is attached to the hub of the wheel portion. The air pressure is detected by the detecting and transmitting unit, and the pressure information is transmitted out of the detecting and transmitting unit to allow the driver to know the tire pressure even while the vehicle is running.

Since one end of the hollow member is connected to the air valve, the detecting and transmitting unit is connected to the opposite end of the hollow member, and the detecting and transmitting unit is attached to the hub of the wheel portion, any deviation from the dynamic balancing of the wheel is minimized.

According to the present invention, the air pressure detecting device is characterized in that the hollow member is disposed along a spoke of the wheel portion. The hollow member disposed along the spoke of the wheel portion does not impair the appearance of the wheel.

According to the present invention, the air pressure detecting device is characterized in that the hollow member is used as at least one spoke of the wheel portion. The hollow member used as at least one spoke of the wheel portion improves the appearance of the wheel.

According to the present invention, an air pressure detecting device for a wheel includes a pressure sensor mounted on an air valve for introducing air into a tire. A detecting and transmitting circuit is provided for detecting pressure information from the pressure sensor and transmitting the pressure information out of the detecting and transmitting unit which is attached to a hub of a wheel portion. The pressure sensor and the detecting and transmitting circuit are connected to each other by a harness.

The pressure sensor mounted on the air valve of the tire serves to increase the accuracy with which to sense the air pressure of the tire, and the detecting and transmitting unit attached to the hub of the wheel portion serves to minimize any deviation from the dynamic balancing of the wheel.

According to the present invention, the air pressure detecting device is characterized in that the harness is disposed along a spoke of the wheel portion. The harness disposed along the spoke of the wheel portion does not impair the appearance of the wheel.

According to the present invention, the air pressure detecting device includes a hollow member that is used as at least one spoke of the wheel portion, and the harness extends through the hollow member.

With the hollow member used as at least one spoke of the wheel portion, and the harness extending through the hollow member, the appearance of the wheel is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a side elevational view of an air pressure detecting device for a wheel according to a fourth embodiment of the present invention; and.

DETAILED DESCRIPTION OF THE PREFERRED EMBODIMENTS

Figure 1:
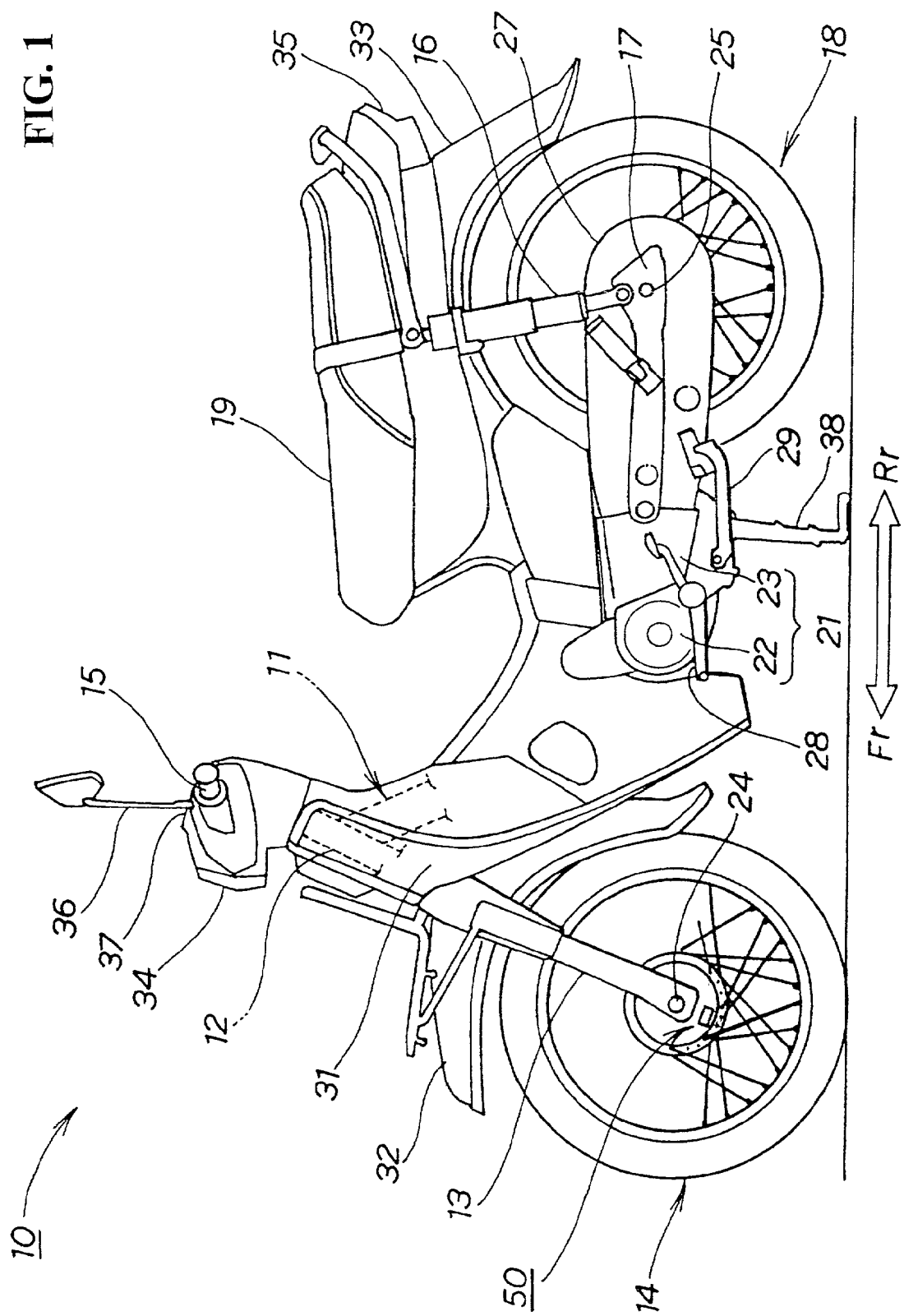
FIG. 1 is a side elevational view of a motorcycle which incorporates an air pressure detecting device for a wheel according to the present invention.

Embodiments of the present invention will be described below with reference to the accompanying drawings. The terms "front," "rear," "left," "right," "upper" and "lower" are used to refer to the directions as viewed from the driver, and "Fr" represents front, "Rr" represents rear, "L" represents left, and "R" represents right. The figures should be viewed in the direction of the reference characters.

FIG. 1 is a side elevational view of a motorcycle which incorporates an air pressure detecting device for a wheel according to the present invention. The motorcycle is an engine-operated motorcycle including, as major components, a chassis frame 11 extending rearwardly and downwardly of the vehicle, a head pipe 12 mounted on the chassis frame 11 and a front fork 13 mounted on the head pipe 12. A front wheel 14 is mounted on the front fork 13 with a handle 15 connected to the front fork 13. A rear suspension 16 includes an end attached to a rear upper portion of the chassis frame 11. A swing arm 17 is swingably connected between the other end of the rear suspension 16 and a rear lower portion of the chassis frame 11. A rear wheel 18 is mounted on the tip end of the swing arm 17. A seat 19 is mounted on the rear upper portion of the chassis frame 11, and a power unit 21 is disposed beneath the chassis frame 11 and includes an engine 22 and a transmission 23.

In FIG. 1, the motorcycle also includes axles 24, 25, a drive chain cover 27, a brake pedal 28, a kick pedal 29, a leg shield 31, a front fender 32, a rear fender 33, a head lamp 34, a tail lamp 35, a rear-view mirror 36, an instrumental panel 37 and a stand 38.

An air pressure detecting device 50 is provided for a wheel (hereinafter referred to as "air pressure detecting device 50"). The air pressure detecting device 50 serves to detect the air pressure of a tire and allows the driver to recognize the air pressure of the tire even while the vehicle is being operated.

Figure 2:
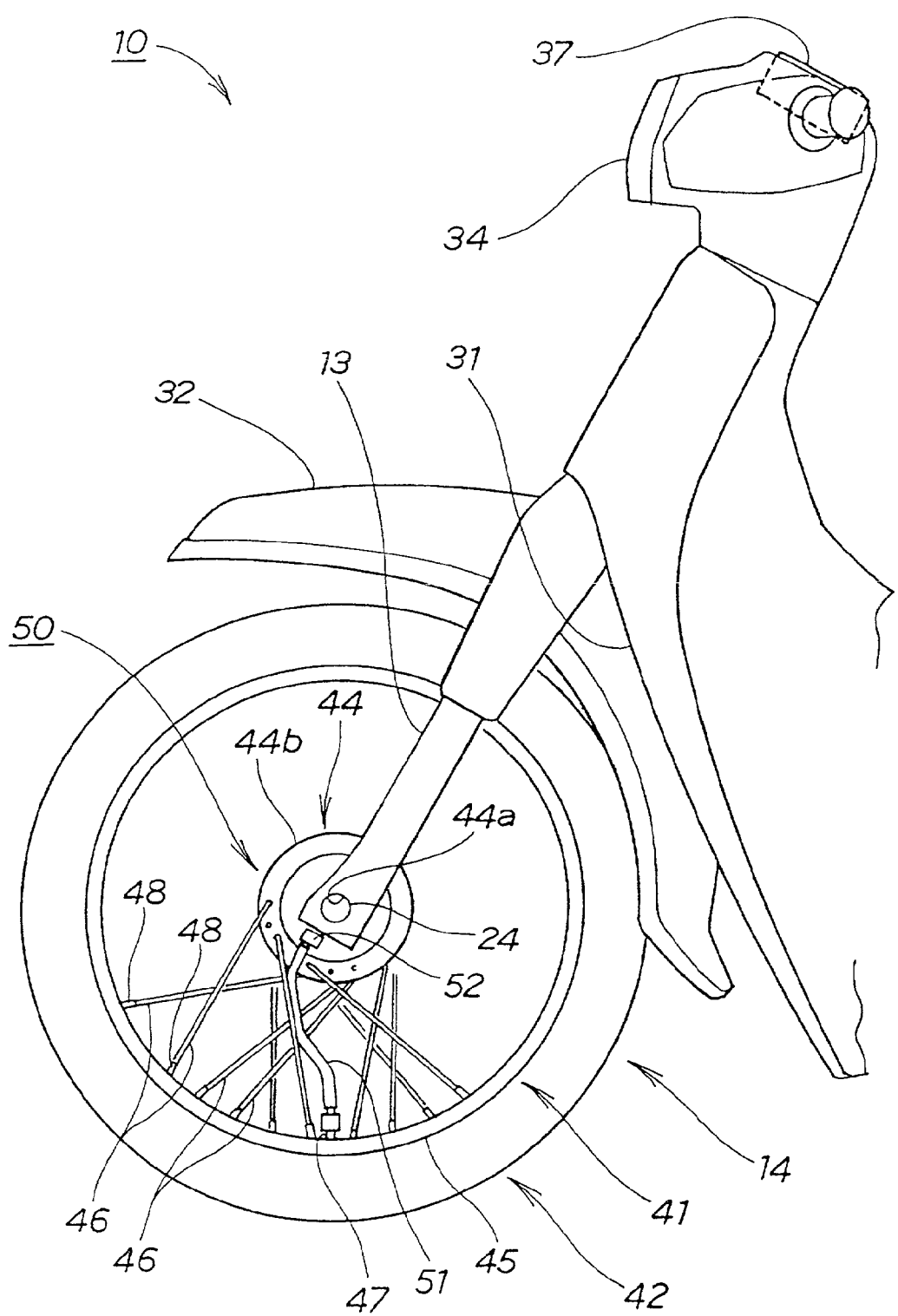
FIG. 2 is a side elevational view of a front portion of the motorcycle which incorporates the air pressure detecting device for a wheel according to the present invention.

FIG. 2 is a side elevational view of a front portion of the motorcycle which incorporates the air pressure detecting device for a wheel according to the present invention.

The wheel 14 comprises a disk-shaped wheel portion 41 and a tire 42 mounted on the wheel portion 41. The wheel 14 has the air pressure detecting device 50 for detecting the air pressure in the tire 42. The tire 42 is a tubeless tire.

The wheel portion 41 comprises a hub 44 rotatably mounted on the axle 24, a rim 45 on which the tire 42 is mounted, and a plurality of spokes 46 . . . ( . . . indicates a plurality) interconnecting the rim 45 and the hub 44.

The hub 44 comprises a bearing member 44a fitted over the axle 24 with a bearing (not shown) interposed therebetween, and disks 44b . . . engaged by the spokes 46 . . . . An air valve 47 is mounted on the rim 45 for introducing air into the tire 42.

The spokes 46 have ends engaging the disks 44b of the hub 44 and other ends attached to the rim 45 by nipples 48, for integrally coupling the rim 45 and the hub 44 to each other.

The rear wheel 18 shown in FIG. 1 is essentially identical to the front wheel 14, and will not be described in detail below.

Figure 3:
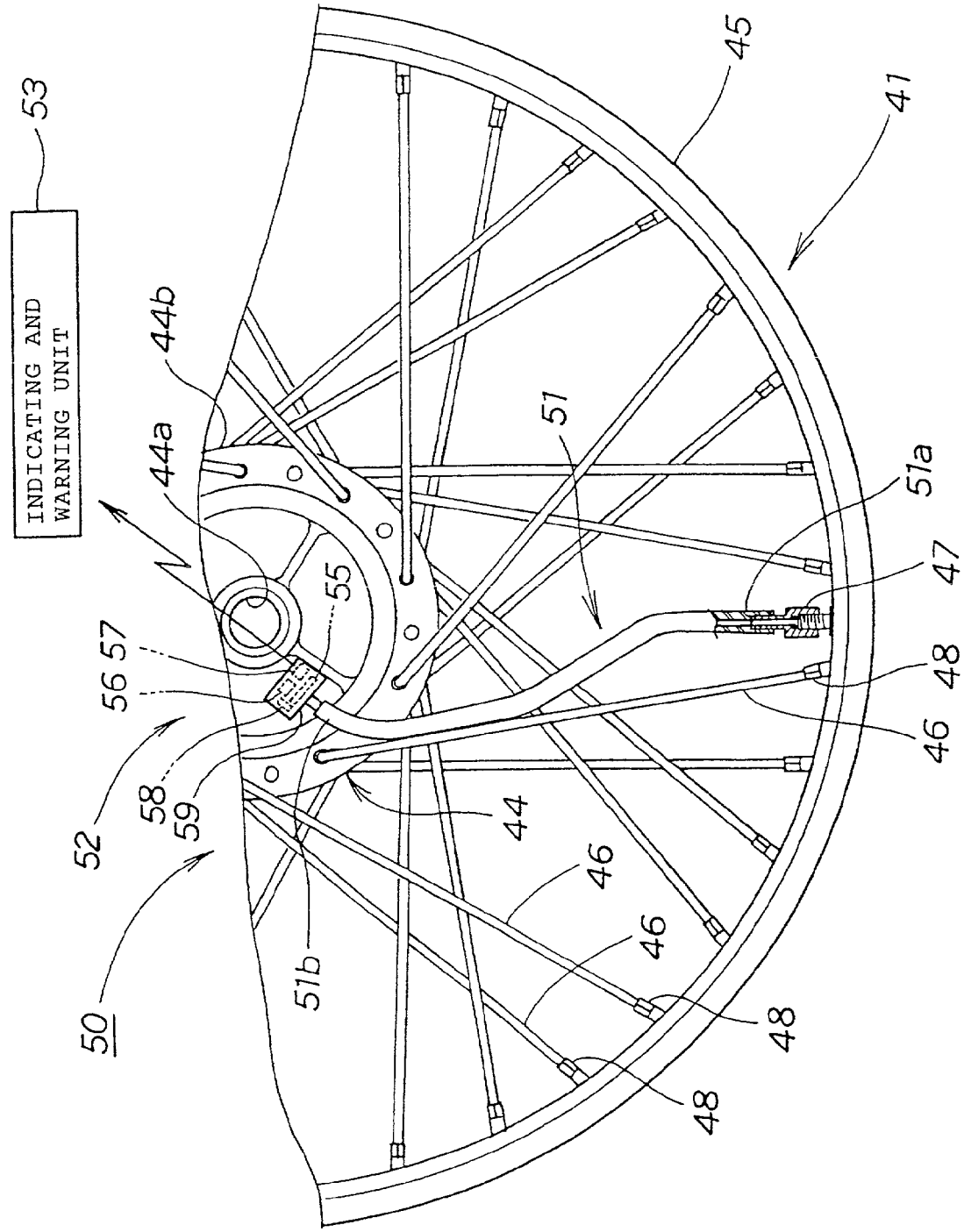
FIG. 3 is a side elevational view of the air pressure detecting device for a wheel according to the present invention.

FIG. 3 is a side elevational view of the air pressure detecting device for a wheel according to the present invention. The air pressure detecting device 50 comprises a hollow member 51 having an end 51a connected to the air valve 47, a detecting and transmitting unit 52 connected to an opposite end 51b of the hollow member 51 for detecting an air pressure in the tire 42 (see FIG. 2) and transmitting pressure information, and an indicating and warning unit 53 for receiving the pressure information from the detecting and transmitting unit 52 and indicating the pressure information or issuing a warning. The indicating and warning unit 53 is a unit mounted on the instrumental panel 37 (see FIG. 2) as described hereinafter.

The hollow member 51 preferably is a rubber hose that can be bent, and is disposed along a spoke 46 of the wheel portion 41.

The detecting and transmitting unit 52 comprises a pressure sensor 55 for detecting a tire pressure, a detecting circuit 56 is connected to the pressure sensor 55 for extracting the pressure information as an electric signal. A transmitting circuit 57 is provided for transmitting the electric signal from the detecting circuit 56 as a radio wave. A cell 58 energizes the detecting circuit 56 and the transmitting circuit 57. A case 59 is provided for housing the pressure sensor 55, the detecting circuit 56, the transmitting circuit 57 and the cell 58.

More specifically, in the air pressure detecting device 50, the end 51a of the hollow member 51 is connected to the air valve 47 for introducing air into the tire 42. The detecting and transmitting unit 52 for detecting the air pressure in the tire 42 and for transmitting pressure information out of the detecting and transmitting unit 52 is connected to the opposite end 51b of the hollow member 51, and the detecting and transmitting unit 52 is mounted on the hub 44 of the wheel portion 41.

The air pressure of the tire 42 (see FIG. 2) which is detected for effective driving information when it can be known while the vehicle is being operated. One end 51a of the hollow member 51 is connected to the air valve 47, the detecting and transmitting unit 52 is connected to the opposite end 51b of the hollow member 51, and the detecting and transmitting unit 52 is attached to the hub 44 of the wheel portion 41. The air pressure is detected by the detecting and transmitting unit 52, and the pressure information is transmitted out of the detecting and transmitting unit 52 to allow the driver to know the tire pressure even while the vehicle is being operated.

In the air pressure detecting device 50, the end 51a of the hollow member 51 is connected to the air valve 47, the detecting and transmitting unit 52 is connected to the opposite end 51b of the hollow member 51, and the detecting and transmitting unit 52 is mounted on the hub 44 of the wheel portion 41. Therefore, any deviation from the dynamic balancing of the wheel 14 (see FIG. 2) can be minimized. Consequently, the air pressure detecting device 50 can be installed subsequently on the vehicle.

Since the hollow member 51 is disposed along the spoke 46 of the wheel portion 41, the air pressure detecting device 50 does not impair the appearance of the wheel portion 41, and hence the design of the wheel portion 41 is maintained.

Figure 4:
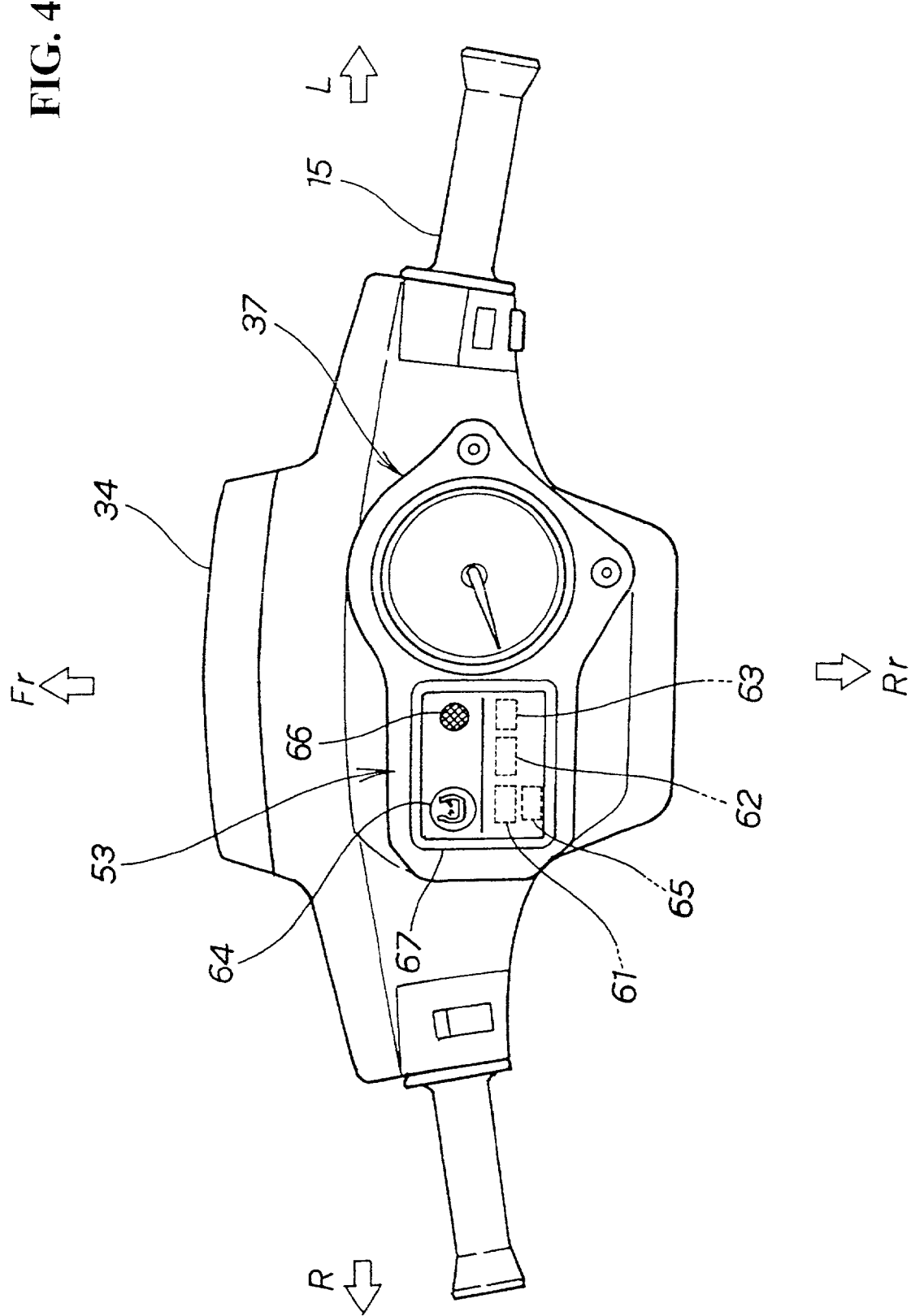
FIG. 4 is a plan view of an indicating and warning unit of the air pressure detecting device according to the present invention.

FIG. 4 is a plan view of the indicating and warning unit of the air pressure detecting device according to the present invention, showing the instrumental panel 37 mounted on the handle 15 in plan.

The indicating and warning unit 53 is mounted on the instrumental panel 37, and comprises a receiving circuit 61 for receiving a radio wave transmitted from the detecting and transmitting unit 52 shown in FIG. 3. A voltage amplifying circuit 62 is provided for amplifying a signal received by the receiving circuit 61. An indicating circuit 63 is provided for indicating a tire pressure based on a voltage value amplified by the voltage amplifying circuit 62. An indicating means 64 is energizable by the indicating circuit 63. A warning activating circuit 65 is operable when the voltage value amplified by the voltage amplifying circuit 62 is lower than a predetermined voltage value. A warning means 66 is energizable by the warning activating circuit 65. A housing 67 is provided for housing the receiving circuit 61, the voltage amplifying circuit 62, indicating circuit 63, the indicating means 64, the warning activating circuit 65 and the warning means 66.

The operation of the air pressure detecting device 50 as described above will be described below.

Figure 5:
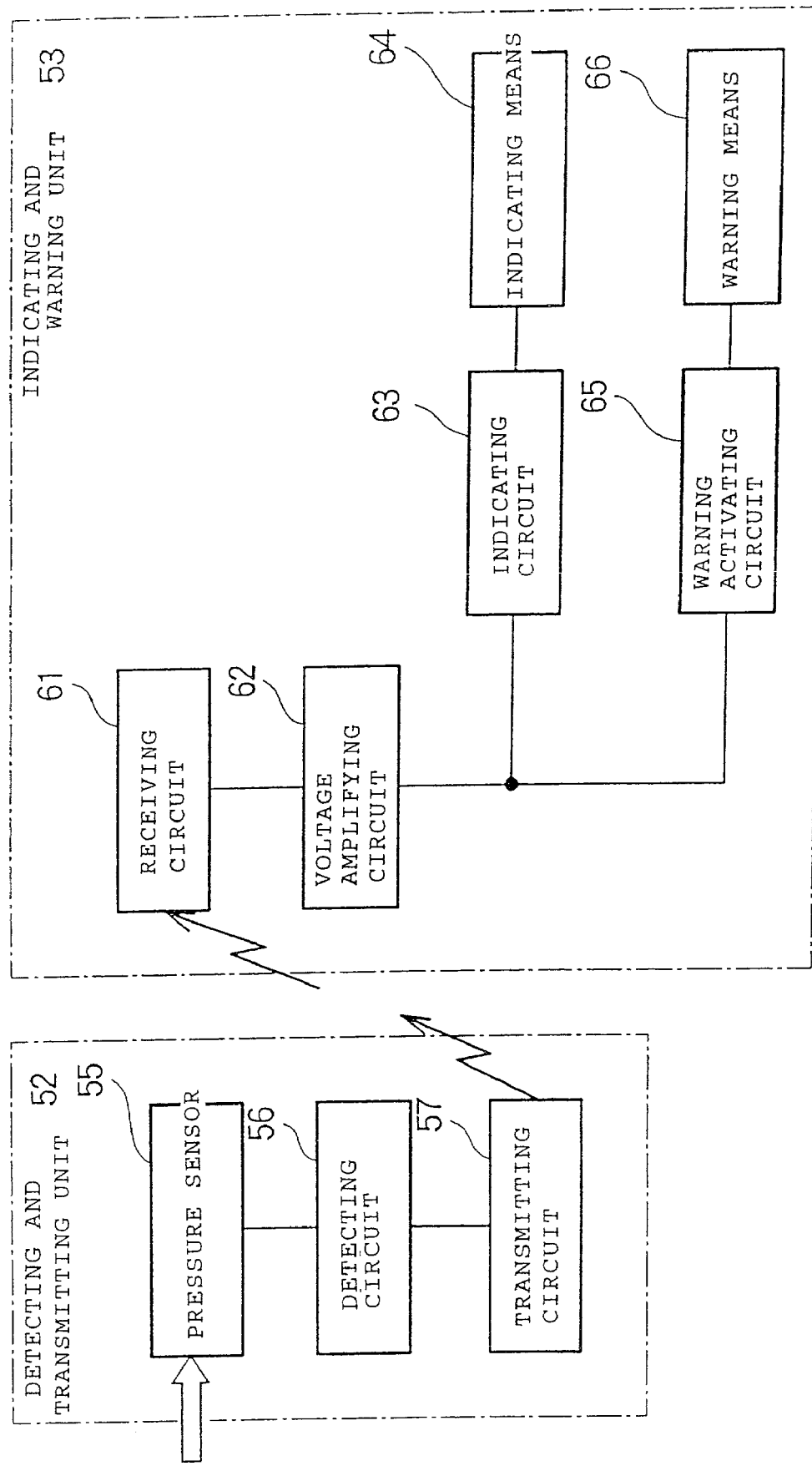
FIG. 5 is a block diagram of an air pressure detecting device for a wheel according to the present invention.

FIG. 5 is a block diagram of the air pressure detecting device for a wheel according to the present invention. The pressure sensor 55 detects a tire pressure, and the detecting circuit 56 extracts pressure information as an electric signal. The transmitting circuit 57 transmits the electric signal to the indicating and warning unit 53.

The radio wave transmitted from the detecting and transmitting unit 52 is received by the receiving circuit 61, and a signal received by the receiving circuit 61 is amplified by the voltage amplifying circuit 62. In order to indicate the tire pressure based on a voltage value amplified by the voltage amplifying circuit 62, the indicating circuit 63 converts the voltage value into a predetermined signal, and the indicating means 64 indicates the tire pressure.

When the voltage value amplified by the voltage amplifying circuit 62 is lower than a predetermined voltage value, the warning activating circuit 65 is operated to cause the warning means 66 to indicate a lack of tire pressure.

Figure 6:
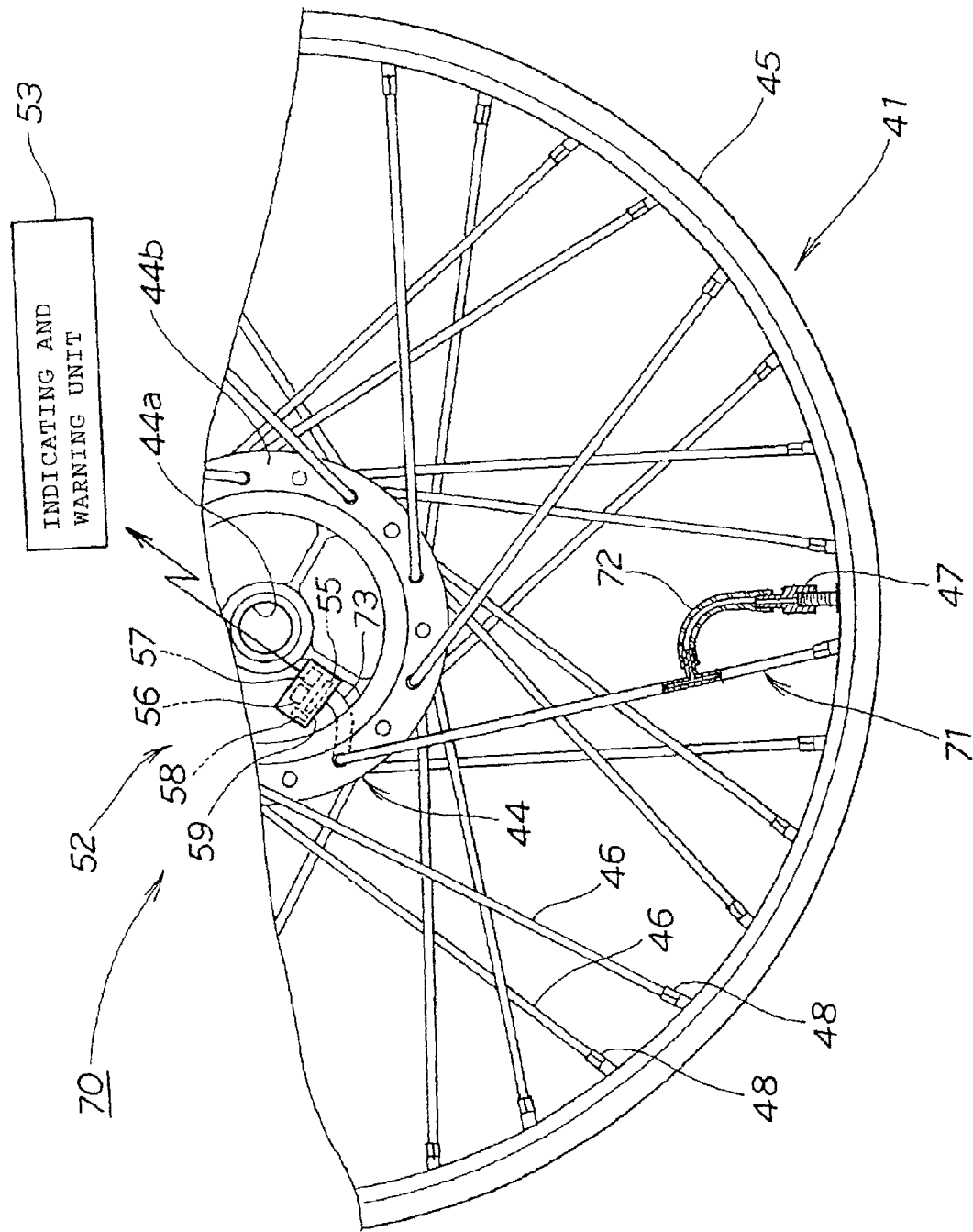
FIG. 6 is a side elevational view of an air pressure detecting device for a wheel according to a second embodiment of the present invention.

FIG. 6 is a side elevational view of an air pressure detecting device for a wheel according to a second embodiment of the present invention. Those part of the air pressure detecting device according to the second embodiment which are identical to those of the air pressure detecting device 50 (see FIG. 3) are denoted by identical reference characters, and will not be described in detail below.

In FIG. 6, a wheel portion 41 includes a hub 44, with spokes 46 . . . , an air valve 47, nipples 48, and an indicating and warning unit 53. An air pressure detecting device 70 for the wheel uses at least one of the spokes 46 . . . as a hollow member 71. The hollow member 71 and the air valve 47 are connected to each other by a hose 72. The tip end of the hollow member 71 and a detecting and transmitting unit 52 are connected to each other by a hose 73.

In the air pressure detecting device 70, at least one of the spokes 46 . . . is used as the hollow member 71 to improve the appearance of the wheel portion 41.

Figure 7:
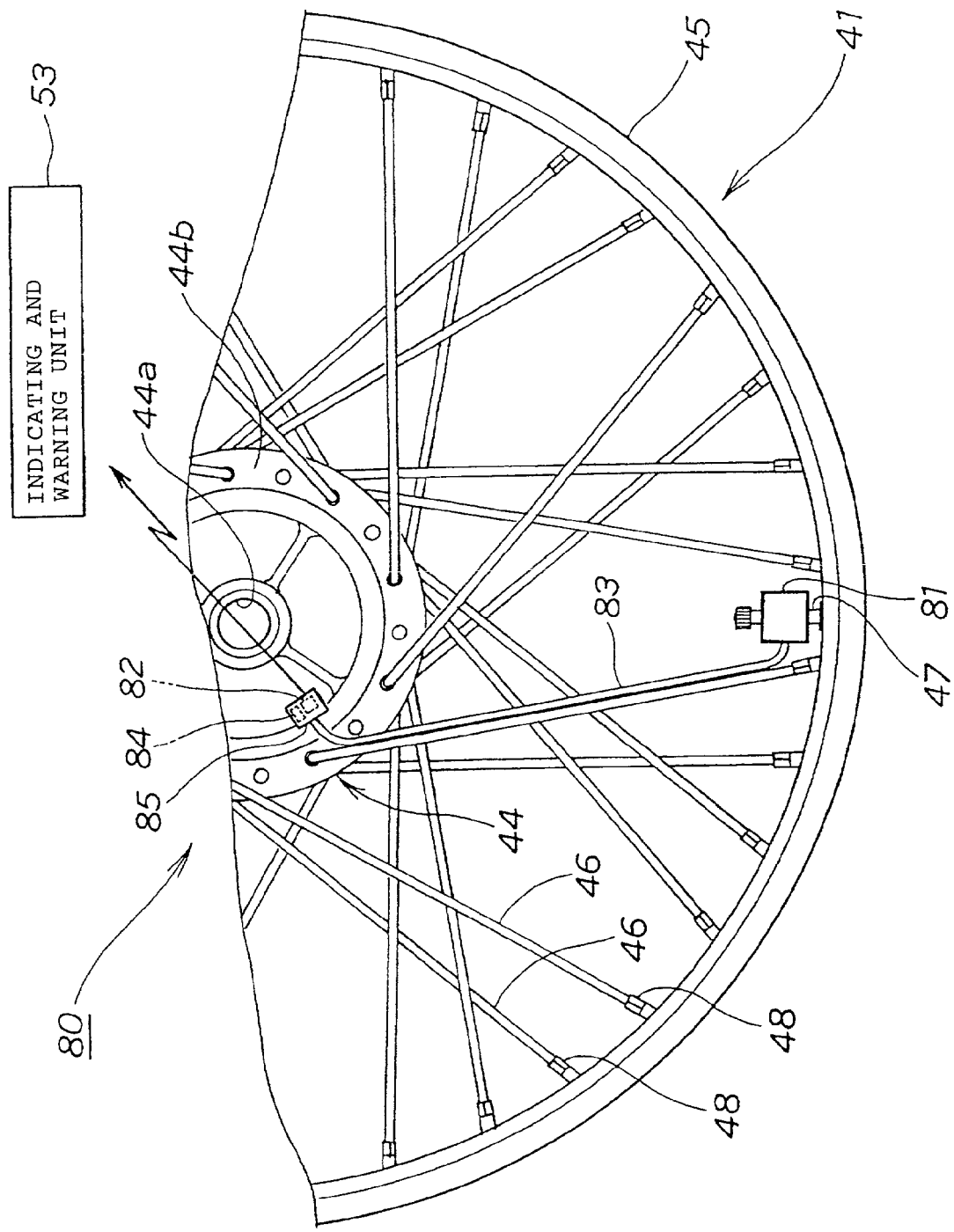
FIG. 7 is a side elevational view of an air pressure detecting device for a wheel according to a third embodiment of the present invention.

FIG. 7 is a side elevational view of an air pressure detecting device for a wheel according to a third embodiment of the present invention. Those part of the air pressure detecting device according to the third embodiment which are identical to those of the air pressure detecting device 50 (see FIG. 3) are denoted by identical reference characters, and will not be described in detail below.

FIG. 7 illustrates spokes 46 . . . , nipples 48, and an indicating and warning unit 53. An air pressure detecting device 80 for the wheel has a pressure sensor 81 mounted on an air valve 47 which introduces air into a tire 42 (see FIG. 2). A detecting and transmitting circuit 82 for detecting pressure information from the pressure sensor 81 and transmitting the pressure information out of the detecting and transmitting circuit 82 is attached to the hub 44 of a wheel portion 41, and the pressure sensor 81 and the detecting and transmitting circuit 82 are connected to each other by a harness 83. A cell 84 energizes the detecting and transmitting circuit 82, and the detecting and transmitting circuit 82 is housed in a case 85.

Since the pressure sensor 81 is mounted on the air valve 47, the air pressure detecting device 80 can increase the accuracy with which to sense the tire pressure. The detecting and transmitting circuit 82 attached to the hub 44 of the wheel portion 41 minimizes any deviation from the dynamic balancing of the wheel 14 (see FIG. 2).

Figure 8:
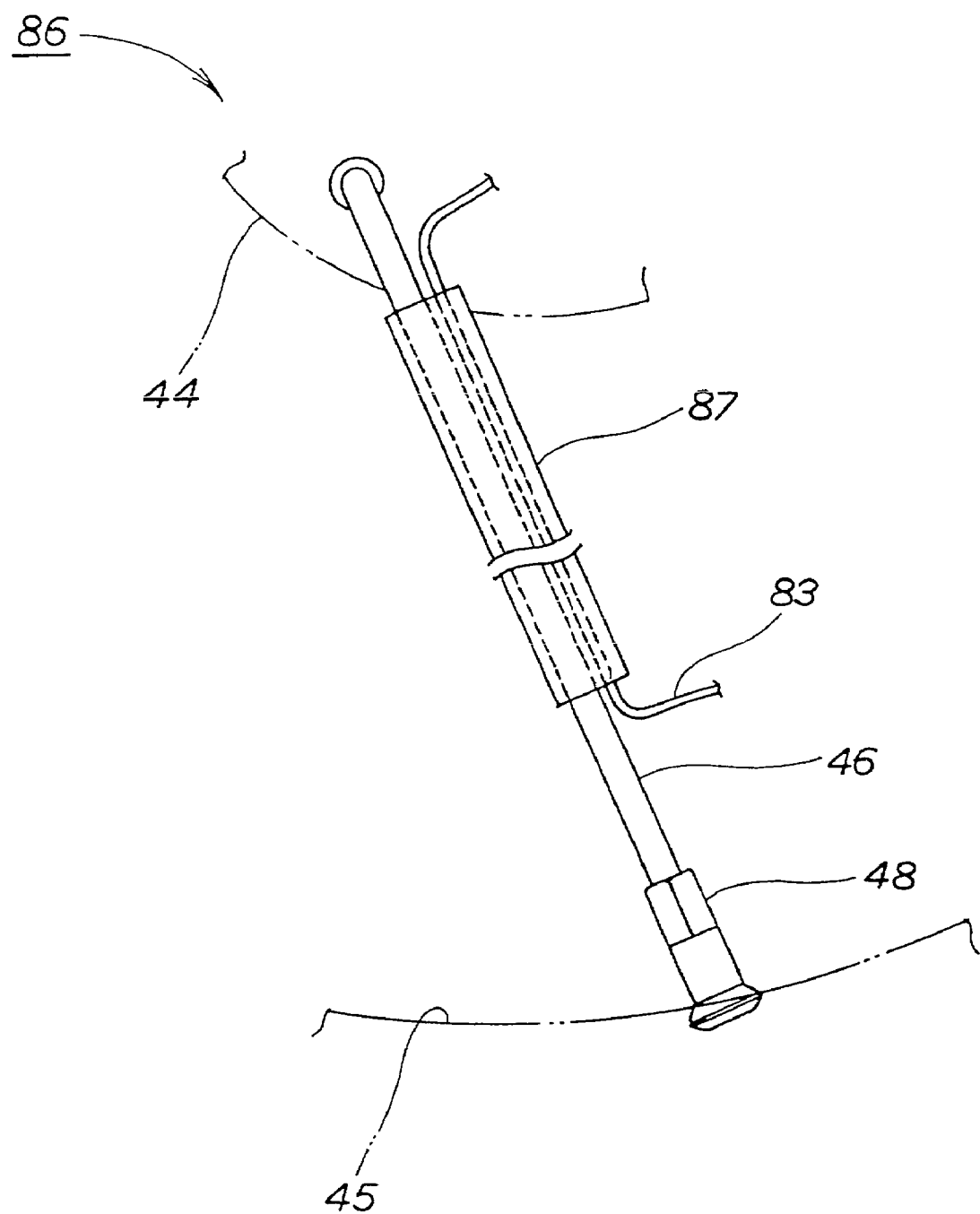

FIG. 8 is a side elevational view of an air pressure detecting device for a wheel according to a fourth embodiment of the present invention. Those part of the air pressure detecting device according to the fourth embodiment which are identical to those of the air pressure detecting device 80 (see FIG. 7) are denoted by identical reference characters, and will not be described in detail below.

An air pressure detecting device 86 for a wheel has a cover member 87 integrally covering a spoke 46 and a harness 83, thus holding the harness 83 disposed along the spoke 46. Since the harness 83 is disposed along the spoke 46, the air pressure detecting device 86 does not impair the appearance of the wheel portion 41 (see FIG. 7), and hence the design of the wheel portion 41 is maintained.

Figure 9:
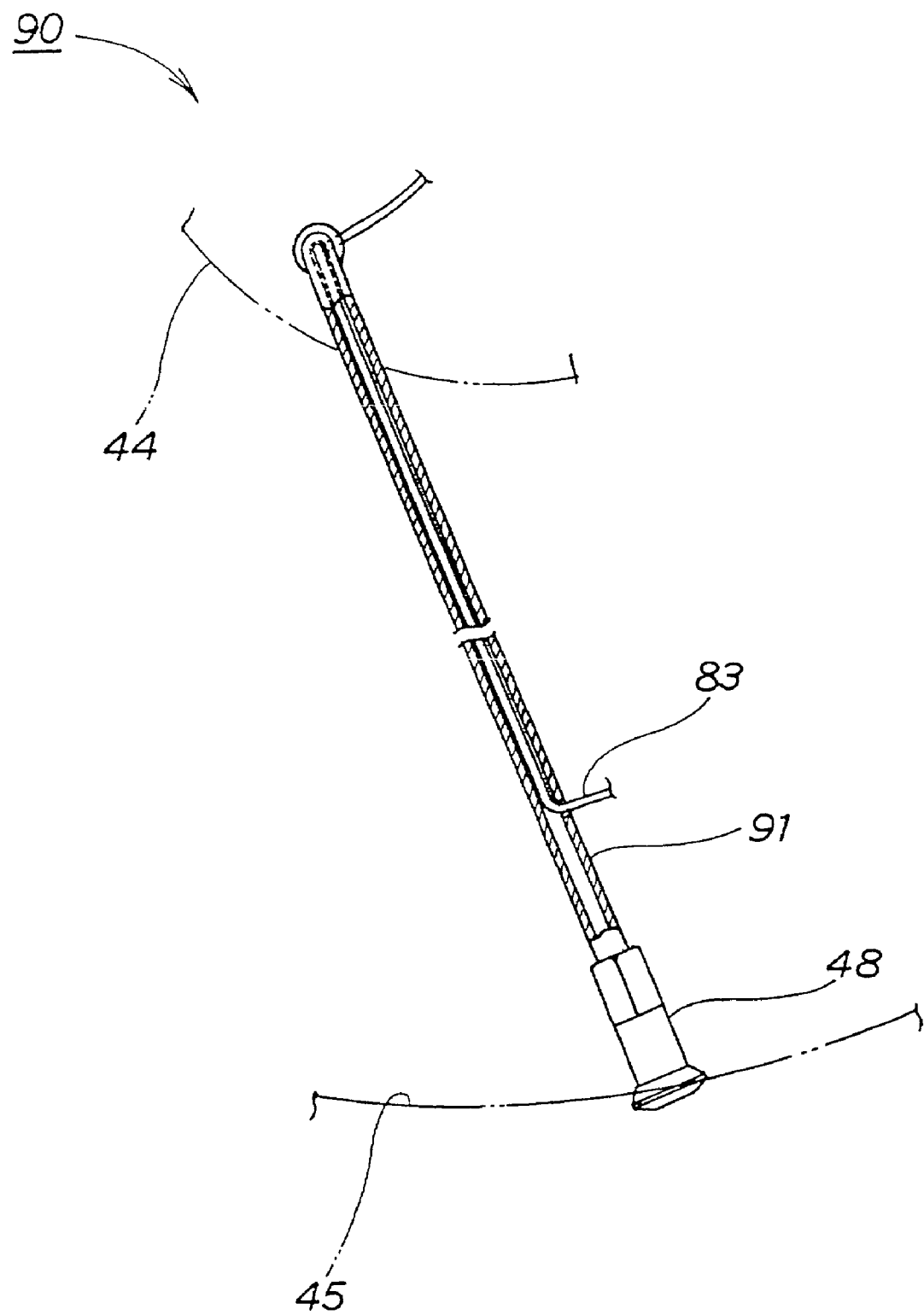
FIG. 9 is a side elevational view of an air pressure detecting device for a wheel according to a fifth embodiment of the present invention.

FIG. 9 is a side elevational view of an air pressure detecting device for a wheel according to a fifth embodiment of the present invention. Those part of the air pressure detecting device according to the fifth embodiment which are identical to those of the air pressure detecting device 80 (see FIG. 7) are denoted by identical reference characters, and will not be described in detail below.

An air pressure detecting device 90 for a wheel uses at least one of spokes 46 . . . (see FIG. 7) as a hollow member 91, and a harness 83 extending through the hollow member 91. Because at least one of the spokes 46 . . . (see FIG. 7) is used as the hollow member 91, and the harness 83 extends through the hollow member 91, the air pressure detecting device 90 improves the appearance of the wheel portion 41 (see FIG. 7).

In the above embodiments, the vehicle has been described as the motorcycle 10 as shown in FIG. 1. However, the vehicle is not limited to a two-wheel vehicle, but may be a four-wheel or three-wheel vehicle.

In the above embodiments, the tire 42 has been described as a tubeless tire. However, the tire 42 is not limited to a tubeless tire, but may be a tire with a tube.

In the above embodiment, the indicating means 64 and the warning means 66 are mounted on the instrumental panel 37 as shown in FIG. 4. However, they may be incorporated in the chassis frame or a helmet if they issue a warning, or may be incorporated in the seat or a helmet if they apply vibrations. While the indicating and warning unit 53 has been described as a unit for the front wheel 14 (see FIG. 1), it may also be used as a unit for indicating a tire pressure or issuing a warning for the rear wheel 18 (see FIG. 1).

The present invention thus arranged offers the following advantages:

According to the present invention, there is provided an air pressure detecting device for a wheel wherein an end of a hollow member is connected to an air valve for introducing air into a tire, a detecting and transmitting unit for detecting an air pressure in the tire and transmitting pressure information out of the detecting and a transmitting unit is connected to an opposite end of the hollow member, and the detecting and transmitting unit is attached to the hub of a wheel portion. Therefore, any deviation from the dynamic balancing of the wheel can be minimized. Consequently, the air pressure detecting device for a wheel can be installed subsequently on the vehicle.

According to the present invention, since the hollow member is disposed along a spoke of the wheel, the hollow member does not impair the appearance of the wheel portion and, as a result, the design of the wheel portion is maintained.

According to the present invention, since the hollow member is used as at least one spoke of the wheel portion, the hollow member improves the appearance of the wheel portion.

According to the present invention, since a pressure sensor is mounted on an air valve, it increases the accuracy with which to sense the air pressure of the tire, and since the detecting and transmitting unit is attached to the hub of the wheel portion, it minimizes any deviation from the dynamic balancing of the wheel.

According to the present invention, since the harness is disposed along a spoke of the wheel portion, it does not impair the appearance of the wheel portion and, as a result, keeps the design of the wheel portion.

According to the present invention, since a hollow member is used as at least one spoke of the wheel portion, and the harness extends through the hollow member, the appearance of the wheel portion is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air pressure detecting device for a wheel comprising:
    an air valve for introducing air into a tire;
    a hollow member extending between a hub and a rim of the wheel portion, one end of the hollow member being operatively connected to said air valve via a hose; and
    a detecting and transmitting unit for detecting an air pressure in the tire and transmitting pressure information out of the detecting and transmitting unit, said detecting and transmitting unit being connected to a second end of the hollow member;
    said detecting and transmitting unit being operatively attached to the hub of a wheel portion;
    wherein said hollow member is used as at least one spoke of said wheel portion.

2. The air pressure detecting device for a wheel according to claim 1, wherein the detecting and transmitting unit includes a pressure sensor for determining the pressure within a tire.

3. The air pressure detecting device for a wheel according to claim 2, wherein the detecting and transmitting unit includes a detecting circuit for receiving pressure information from the pressure sensor and for producing an electrical signal.

4. The air pressure detecting device for a wheel according to claim 3, wherein the detecting and transmitting unit includes a transmitting circuit for transmitting the electrical signal from the detecting circuit as a radio wave.

5. An air pressure detecting device for a wheel comprising:
    an air valve for introducing air into a tire;
    a pressure sensor is mounted on said air valve;
    a detecting and transmitting circuit for detecting pressure information from said pressure sensor and transmitting the pressure information out of the detecting and transmitting circuit;
    said detecting and transmitting circuit being attached to a hub of a wheel portion, and said pressure sensor and the detecting and transmitting circuit are connected to each other by a harness.

6. The air pressure detecting device for a wheel according to claim 5, wherein said harness is disposed along a spoke of said wheel portion.

7. The air pressure detecting device for a wheel according to claim 5, wherein a hollow member is used as at least one spoke of said wheel portion, and said harness extends through the hollow member.

8. The air pressure detecting device for a wheel according to claim 5, wherein the detecting and transmitting unit includes a detecting circuit for receiving pressure information from the pressure sensor and for producing an electrical signal.

9. The air pressure detecting device for a wheel according to claim 8, wherein the detecting and transmitting unit includes a transmitting circuit for transmitting the electrical signal from the detecting circuit as a radio wave.

10. An air pressure detecting device for detecting pressure of a tire while a vehicle is being operated comprising:
    an air valve for introducing air into a tire;
    a hollow member extending between a hub and a rim of a wheel portion, said hollow member being used as at least one spoke of said wheel portion; and
    a detecting and transmitting unit for detecting an air pressure in the tire and transmitting pressure information out of the detecting and transmitting unit while a vehicle is being operated, said detecting and transmitting unit being operatively attached to the hub of a wheel portion; and
    a harness connecting an air sensor to the detecting and transmitting unit, the harness passing through at least a part of a length of the hollow member in order to improve an appearance of said wheel portion.

11. The air pressure detecting device for detecting pressure of a tire while a vehicle is being operated according to claim 10, wherein the detecting and transmitting unit includes a pressure sensor for determining the pressure within a tire.

12. The air pressure detecting device for detecting pressure of a tire while a vehicle is being operated according to claim 11, wherein the detecting and transmitting unit includes a detecting circuit for receiving pressure information from the pressure sensor and for producing an electrical signal.

13. The air pressure detecting device for detecting pressure of a tire while a vehicle is being operated according to claim 12, wherein the detecting and transmitting unit includes a transmitting circuit for transmitting the electrical signal from the detecting circuit as a radio wave.

* * * * *